United States Patent
L. et al.

(10) Patent No.: US 10,257,161 B2
(45) Date of Patent: Apr. 9, 2019

(54) USING NEIGHBOR DISCOVERY TO CREATE TRUST INFORMATION FOR OTHER APPLICATIONS

(75) Inventors: Balaji B. L., Karnataka (IN); Yves Hertoghs, Brabant (BE); Michael Behringer, Provence-Alpes-Cote d'Azur (FR); Steinthor Bjarnason, Fjerdingby (NO)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 13/477,913

(22) Filed: May 22, 2012

(65) Prior Publication Data
US 2013/0318570 A1 Nov. 28, 2013

(51) Int. Cl.
*H04L 12/24* (2006.01)
*H04L 29/06* (2006.01)

(52) U.S. Cl.
CPC .......... *H04L 63/00* (2013.01); *H04L 63/20* (2013.01); *H04L 41/12* (2013.01); *H04L 63/0823* (2013.01); *H04L 63/102* (2013.01); *H04L 63/164* (2013.01); *H04L 63/168* (2013.01)

(58) Field of Classification Search
CPC ..... H04L 63/00; H04L 63/20; H04L 63/0823; H04L 63/102; H04L 63/168; H04L 63/164; H04L 41/12
USPC ........................................ 726/4–10
See application file for complete search history.

(56) References Cited

U.S. PATENT DOCUMENTS

| | | | |
|---|---|---|---|
| 7,451,305 B1 | 11/2008 | Pritikin | |
| 8,095,788 B2 | 1/2012 | Vilhuber et al. | |
| 9,130,837 B2 | 9/2015 | Bjarnason et al. | |
| 2005/0246771 A1 | 11/2005 | Hunt et al. | |
| 2006/0077945 A1* | 4/2006 | KethiReddy et al. | 370/346 |
| 2007/0101400 A1* | 5/2007 | Freeman et al. | 726/2 |

(Continued)

FOREIGN PATENT DOCUMENTS

| | | |
|---|---|---|
| CN | 102404247 A | 4/2012 |
| WO | WO2013176689 | 11/2013 |
| WO | WO2013177069 | 11/2013 |

OTHER PUBLICATIONS

Arkko, J. et al, Secure Neighbor Discovery (SEND), Mar. 2005, rfc3971.*

(Continued)

*Primary Examiner* — Linglan E Edwards
*Assistant Examiner* — Forrest L Carey (57) ABSTRACT

Neighbor discovery is used to create a generic trust database for other applications. As part of the neighbor discovery, each device performs classification and validation of the credentials of the neighboring devices. The credentials and validation results are stored locally without having to perform a separate authentication step. The trust database is created and maintained as a neighbor table with the results of the validation. The generic trust database may then be consulted by other protocols. The neighbor discovery may use any of various underlying protocols, but the resulting table unifies the results such that other applications or protocols may take advantage of the secured identity without having to implement their own discovery process. Both discovery and validation may be implemented locally without relying on centralized servers. Manual configuration may be avoided.

22 Claims, 3 Drawing Sheets

(56) References Cited

U.S. PATENT DOCUMENTS

| | | | |
|---|---|---|---|
| 2008/0028436 A1* | 1/2008 | Hannel et al. | 726/1 |
| 2008/0086760 A1* | 4/2008 | Jiang et al. | 726/3 |
| 2008/0307516 A1 | 12/2008 | Levy-Abegnoli et al. | |
| 2009/0217357 A1* | 8/2009 | Dell'Uomo | H04L 63/10 726/5 |
| 2010/0017597 A1* | 1/2010 | Chandwani | H04L 29/1232 713/156 |
| 2010/0306352 A1 | 12/2010 | Pritikin et al. | |
| 2010/0306827 A1* | 12/2010 | Esteve Balducci et al. | 726/4 |
| 2011/0004763 A1* | 1/2011 | Sato | H04L 63/06 713/175 |
| 2011/0161659 A1 | 6/2011 | Himawan et al. | |
| 2012/0066320 A1* | 3/2012 | Taniuchi | 709/206 |
| 2012/0167185 A1 | 6/2012 | Menezes et al. | |
| 2013/0047266 A1* | 2/2013 | Radhakrishnan | H04L 63/0807 726/28 |
| 2013/0205003 A1* | 8/2013 | Vyas | H04L 69/167 709/224 |
| 2015/0280916 A1 | 10/2015 | Bjarnason et al. | |

OTHER PUBLICATIONS

Khan et al, A security adaptive protocol suite: Ranked Neighbor Discovery (RND) and Security Adaptive AODV (SA-AODV), 2008, Electrical and Computer Engineering, obtained from http://ieeexplore.ieee.org/stamp/stamp.jsp?tp=&arnumber=4769278.*
"The Public Key Infrastructure Approach to Security," Oracle9i Security Overview, Release 2 (9.2) Part No. A96582-01, © 2001-2002 Oracle Corporation, 8 pages; http://docs.oracle.com/cd/B10500_01/network.920/a96582/pki.htm.
Cisco Systems, Inc., "Unique Device Identifier Retrieval," © 2003-2006 Cisco Systems, Inc., 12 pages; http://www.cisco.com/en/US/docs/ios/12_3t/12_3t4/feature/guide/gtpepudi.html.
Cisco, Understanding Cisco TrustSec, Revised Jun. 16, 2011, 10 pages; http://www.cisco.com/en/US/docs/switches/lan/trustsec/configuration/guide/arch_over.html.
Cooper, et al., "Internet X.509 Public Key Infrastructure Certificate and Certificate Revocation List (CRL) Profile," Network Working Group RFC 5280, May 2008, 166 pages; http://www.ietf.org/rfc/rfc5280.txt.
Interopnet Labs, "What is EAP-FAST48 " InteropNet Labs Full Spectrum Security Initiative (May 2005), 1 page; http://www.opus1.com/nac/whitepapers-old/e-eapfast-Iv05.pdf.
"IEEE 802.1X," webpage, Wikipedia, http://en.wikipedia.org/wiki/IEEE_802.1X, pp. 1-7, May 22, 2012.
"IEEE 802.1X-2004—Port Based Network Access Control," webpage, http://www.ieee802.org/1/pages/802.1x-2004.html, pp. 1-3, May 22, 2012.
"Secure Neighbor Discovery Protocol," webpage, Wikipedia, http://en.wikipedia.org/wiki/Secure_Neighbor_Discovery_Protocol, pp. 1-2, May 22, 2012.
"Neighbor Discovery for IP version 6 (IPv6)," webpage, http://tools.ietf.org/html/rfc4861, pp. 1-97, May 22, 2012.
"Cisco Discovery Protocol," webpage, Wikipedia, http://en.wikipedia.org/wiki/Cisco_Discovery_Protocol, p. 1, May 22, 2012.
"Link Layer Discovery Protocol," webpage, Wikipedia, http://en.wikipedia.org/wiki/Link_Layer_Discovery_Protocol, pp. 1-3, May 22, 2012.
"Routing Protocol Security Requirements (rpsec) (concluded WG)," webpage, http://datatracker,ietf.org/wg/rpsec/charter/, pp. 1-2, May 22, 2012.
"Neighbor Router Authentication: Overview Guidelines," webpages, Cisco IOS Security Configuration Guide, http://www.cisco.com/en/US/docs/ios/12_2/security/configuration/guide/scfroutr.html, pp. 1-5, May 22, 2012.
International Search Report from related PCT Application No. PCT/US2012/048527, dated Oct. 15, 2013, WO.
Written Opinion from related PCT Application No. PCT/US2012/048527, dated Oct. 15, 2013, WO.
P.C. Van Oorschot et al., On Interdomain Routing Security and Pretty Secure BGP (psBGP), Jul. 3, 2007, vol. 10, No. 3, ACM Transactions on Information and System Security.
Partial Search Report cited in PCT/US2012/048527, dated Aug. 1, 2013.
T. Narten et al., Neighbor Discovery for IP version 6 (IPv6); RFC 4861, Sep. 2007, Internet Engineering Task Force (IETF).
IEEE Standard for Local and Metropolitan Area Networks, Secure Device Identify, Dec. 1, 2009, pp. C1-C77, IEEE Standard, Piscataway, NJ.
International Search Report and Written Opinion cited in PCT/US2013/041878, dated Aug. 27, 2013.
Klenk et al., Automated Trust Negotiation in Autonomic Environments, 2007, In Self-Organizing Systems, Tubingen, Germany.
Non-Final Office Action cited in U.S. Appl. No. 13/478,030, dated Jan. 28, 2014.
Final Office Action from U.S. Appl. No. 13/478,030, dated Sep. 11, 2014.
International Preliminary Report on Patentability cited in PCT/US2013/041878, dated Nov. 25, 2014.
Non-Final Office Action from U.S. Appl. No. 13/478,030, dated Dec. 31, 2014.
Examination Report in corresponding European Application No. 12743852.1, dated Oct. 18, 2016, 4 pages.
Examination Report in corresponding European Application No. 12743852.1, dated Mar. 29, 2018, 5 pages.
"Media Access Control (MAC) Security", IEEE P802.1AE/D5.1, Draft Standard for Local and Metropolitan Area Networks, Jan. 19, 2006, 150 pages.

* cited by examiner

FIG. 1

| Device Identity | Certificate | Valid | Timing | Discovery Method |
|---|---|---|---|---|
| X17.cisco.com | X.509.Cert | Valid | 1/1/11 11:11:11 | AN SEND |
| Y2.cisco.com | X.509.Cert | Valid | 1/1/11 11:11:15 | AN SEND |
| M.webex.com | SUDI | Valid | - | L2 Discovery |

USING NEIGHBOR DISCOVERY TO CREATE TRUST INFORMATION FOR OTHER APPLICATIONS

TECHNICAL FIELD

This disclosure relates in general to the field of computer networks and, more particularly, to establishing trust between network components.

BACKGROUND

Network devices are designed to interoperate with each other in networks to carry services. To avoid disruption by unauthorized devices, various authentication protocols have been implemented. These protocols are often tightly tied to centralized authentication servers. The centralized authentication servers receive authentication data from network devices, perform validation and authorization, and then return a set of authorization steps to be taken. The authentication servers maintain a static or manually created list of devices or passwords for validation. However, maintenance of the list may be burdensome and/or not performed well, leading to difficulties in network operation or lack of timeliness.

Some protocols implemented locally include validation at the local level. For example, an application for creating a virtual private network may include validation functions. Where a device operates a plurality of protocols, the local validation operations for each may waste network resources.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

Neighbor discovery is used to create a generic trust database for other applications. Each device uses neighbor discovery to discover its neighbors. During neighbor discovery, each device regularly sends out credentials to other devices. The receiving devices perform classification and validation of the credentials of the neighboring devices. The credentials and validation results are stored locally without having to perform a separate authentication for other applications. The trust database is created and maintained as a neighbor table with the results of the validation.

The generic trust database may then be consulted by other protocols. The neighbor discovery may use any of various underlying protocols, but the resulting table unifies the results such that other applications or protocols may take advantage of the secured identity without having to implement their own discovery process. Both discovery and validation may be implemented locally without relying on centralized servers. Manual configuration may be avoided.

Figure 1:
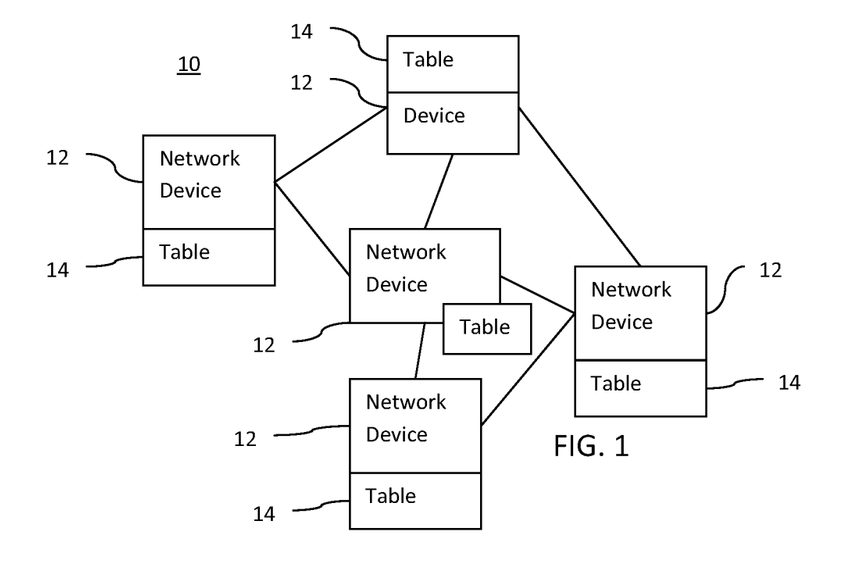
FIG. 1 is a simplified block diagram of an example network environment for using neighbor discovery to create trust information for other applications.
Figure 2:
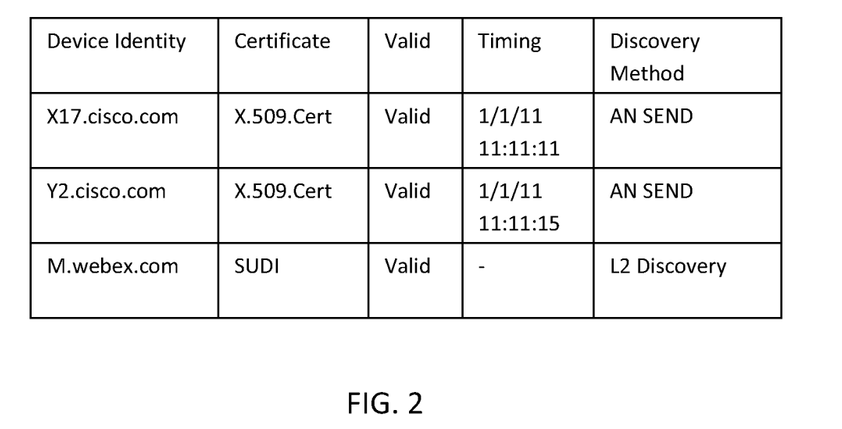
FIG. 2 is an example table of trust information.
Figure 3:
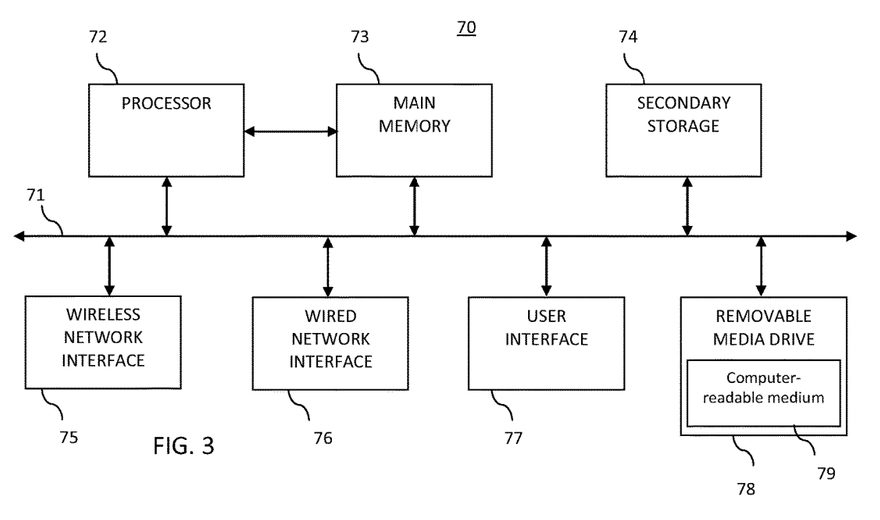
FIG. 3 is a block diagram of one embodiment of a network device for using neighbor discovery to create trust information for other applications.
Figure 4:
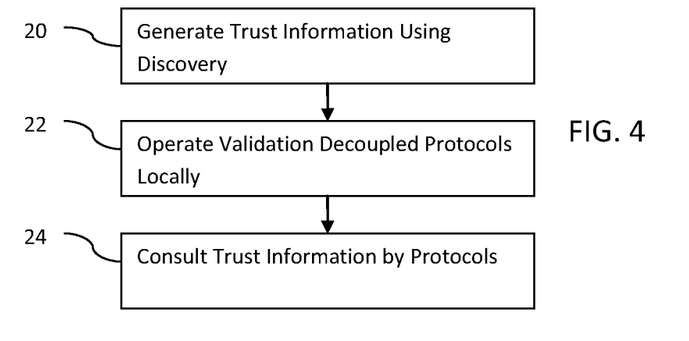
FIG. 4 is a flow chart diagram of one embodiment of a method for using neighbor discovery to create trust information for other applications.
Figure 5:
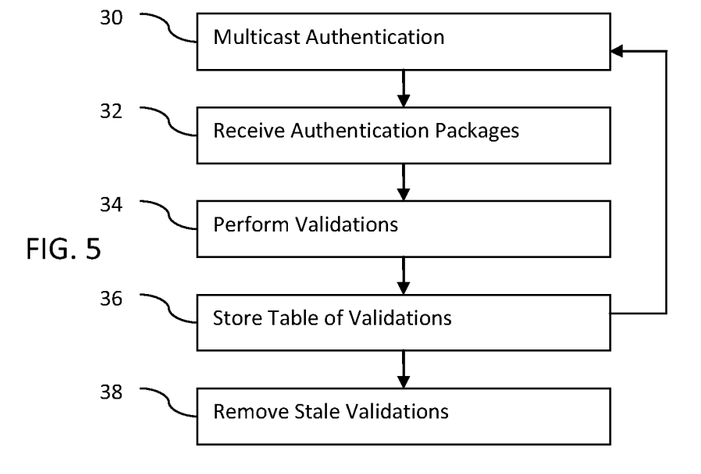
FIG. 5 is a flow chart diagram of another embodiment of a method for using neighbor discovery to create trust information for other applications.
Figure 6:
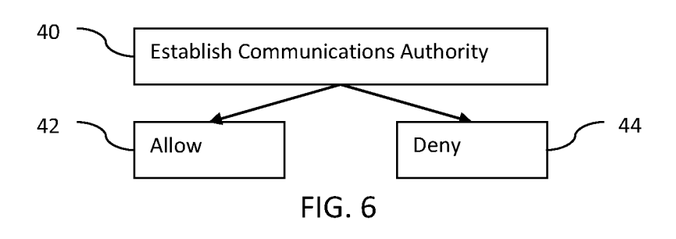
FIG. 6 is a flow chart diagram of a method for using trust information by other applications, according to one embodiment.

FIGS. 1-3 introduce neighbor discovery-based trust information and use by other applications in the context of a network and network device as an apparatus. FIGS. 4-6 provide other details associated with methods.

FIG. 1 shows an example computer network 10. The network 10 includes two or more network devices 12. In one embodiment, the network 10 includes tens, hundreds, thousands or more of the network devices 12. "Network device" is meant to encompass any computing device or network element such as servers, routers, personal computers, laptops, smart phones (e.g., cell phones with computing capabilities), personal digital assistants, client computers, network appliances, switches, bridges, gateways, processors, load balancers, wireless LAN controllers, firewalls, or any other suitable device, component, element, or object operable to affect or process electronic information in a network environment.

The network 10 may be for a single domain (e.g., cisco.com) or multiple domains (e.g., cisco.com and pepsi.com). For example, the network may be a wide area network, local area network, intranet, extranet, wireless local area network, virtual local area network, or combinations of networks for one or more companies.

The network 10 may be relatively static, such as the same network devices 12 being provided over minutes, days, weeks, or years. Network devices 12 may be occasionally added or replaced. In other embodiments, the network 10 is dynamic, such as allowing network devices 12 to be added or removed frequently. For example, personal computers or smart phones may connect or disconnect from the network 10 throughout a day.

The network devices 12 are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

For communicating with each other, the network devices 12 perform neighbor discovery. Neighbors include direct neighbors, such as network devices 12 connected together by one hop or a single link. Neighbors may include indirect neighbors, such as network devices 12 connected together by more than one hop or over multiple links with one or more intervening network devices 12. The neighbors may be neighbors either on layer 2 (link layer) or on layer 3 (network layer).

The neighbor discovery is performed by each of the network devices 12. Each device transmits neighbor discovery packets. For example, each network device 12 broadcasts neighbor discovery packets periodically. The network devices 12, receiving the packets, may perform neighbor discovery for themselves. Each network device 12 determines its own neighbors from the packets transmitted from the neighbors.

Different restrictions in communications over the links may exist between network devices 12 of the different domains. Restrictions may exist for communications between network devices 12 of a same domain. Depending on the data, purpose of communication, and/or other factors, communications links may or may not be established or used. Trust information is used to determine whether to communicate between two network devices 12.

Included in the neighbor discovery operation is validation of those neighbors for establishing communications. Rather than relying on validation coupled specifically to protocols operated by the neighboring network devices 12, validation is coupled to the neighbor discovery. A table 14 for use in trust decisions is created. FIG. 2 shows an example trust table. Different types of data that may be used to determine whether or not or to what level to trust neighbor network devices 12 are determined and stored in the table. In the example of FIG. 2, the types of data include the type of certificate, whether the certificate is valid, the timing of the validity determination (e.g., the freshness of the validation), and the discovery method. The table is a collection of information for different neighbor devices created by a local device. The information is associated with authentication or validation of the neighboring devices relative to the local device. The collected information may be used by other protocols to determine whether or not to communicate with any of the neighboring devices. As discussed below, additional, different, or fewer sources of data may be stored, such as storing a copy of the received or extracted credentials. The credentials are available in the table for use by upper level protocols for further validation or use.

FIG. 3 is a simplified block diagram of an example network device 12, such as a general or special purpose computer. The example network device 70 corresponds to network elements or computing devices that may be deployed in the network 10. The network device 70 includes software and/or hardware to perform any one or more of the activities or operations for creating and using trust information from neighbor discovery.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices 12. For example, the network device 70 may include another processor and/or not include the secondary storage 74 or removable media drive 78. Each network device 12 may include more or less components than other network devices 12.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any non-volatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices 12 via one or more networks. In one example, the wireless network interface 75 includes a wireless network controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in network device 70, or externally connected to network device 70, only one connection option is needed to enable connection of network device 70 to the network 10. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

One or more of the memories 73, 74, 79, or another memory stores the trust table information as a local database. For example, the main memory 73 stores the table of FIG. 2. The identity, certification validity, timing of validity, and discovery method for a plurality of communicatively connected neighbor devices 12 are stored. The contents of the trust table are discussed below.

The processor 72 creates the table. The processor 72 determines the identities, the certification validities, the timings, and the discovery methods during neighbor discovery of the devices. The determination of validity may be made without calls to a remote server or database. The processor 12 automatically discovers neighbors, potentially of different domains and validates the credentials locally. The access list or other validity information is stored locally, such as populating the list through trusted network devices 12. Alternatively, the validity is determined with one or more calls to a remote server, such as an authentication server. The creation of the trust table is discussed below.

The local trust table may be used by different protocols. The processor 72 performs a plurality of different protocols. The protocols determine whether or not to communicate with individual ones of the network devices 12 using the previously discovered identities and at least one of the previously discovered certification validities, the timings, the discovery methods, or other information indicative of trust. Each protocol may use the same or different information from the trust table. By providing the trust table for use by different protocols, the protocols may be free of validation determination other than calls to values determined by the processor during the neighbor discovery. This approach decouples discovery and validation of identity from the usage of that information. The trust table enables other protocols to use this validation information. Existing neighbor discovery protocols are focused on solving specific use cases, tightly coupling together with discovery, validation, authorization and enforcement acts. Decoupling may avoid different protocols using centralized servers for authentication. Removing tight couplings and creating a discovery and validation framework enables re-use of neighbor identities across many protocols. For example, a single neighbor entry in the neighbor table could be used by an open shortest path first (OSPF) routing protocol to securely enable routing towards that neighbor device 12 while at the same time, the same entry is used to enable a media access control (MAC) data communications protocol, such as MAC security standard (MACSEC) protocol on the link between the layers, all without any manual configuration.

The creation of trust information as part of neighbor discovery and the use of the trust information by multiple local protocols may be used in various environments. The trust information may be used in any technology or protocol where there is a need to be able to communicate with trusted neighbors. The neighbor devices 12 are validated, such as by verifying a provided certificate. The upper layer technology decides whether or not to trust the neighbors or not based on the available validity information of the trust table.

In one embodiment, the trust information is used to securely identify neighbors in autonomic networking. Autonomic networking establishes and provides the network 10 with little or no manual user configuration. Rather than centralized control, the network devices 12 are configured to operate independently to form and maintain the network 10. The local network devices 12 make decisions based on pre-determined criteria and/or expressions of intent or goals regarding the network provided from a centralized authority. To interact in implementing localized control, the autonomic network devices 12 create a control plane for secure communications between devices. The control plane is a separate communications path for handling network connectivity and network creation separately from communications using the network. The autonomic networking may allow new nodes to be added to the network without manual configuration from a central or network management node. The control plane is established and the new node added through neighbor discovery and resident configuration.

Neighbor discovery is part of an autonomous network. Neighbor discovery is the first step in autonomic interactions between network devices. An autonomic device automatically, on first boot, enables all interfaces ("no shut"), and starts neighbor discovery on each interface. One goal of the neighbor discovery is to generate a table that shows identification for each adjacent autonomic device and validity thereof. The autonomic device performs neighbor discovery with adjacent autonomic devices. A non-autonomic device in between may be ignored.

Neighbor discovery may not provide a topology, but does provide trust information. Neighbor discovery does not make any judgment on the trust for each neighbor. Factual information (e.g., the validity and/or verification level of that validation) is provided. Other protocols use the trust information to judge trust. Higher level protocols and processes may use the trust information created as part of neighbor discovery. Using the local validation results, the autonomic control plane may be built between neighbor devices 12 of the same domain with current or validated domain credentials. The trust information is used to determine whether other network devices 12 are within the same domain or not and limit communications accordingly.

In another environment, the trust information is created and used for Trustsec operations. Neighbor devices 12 are automatically detected. If the neighbor devices 12 have valid credentials, 802.1AE or the Institute of Electronics and Electrical Engineers (IEEE) MACSEC is enabled on the link between those two network devices 12. A manually configured pre-shared secret may not be needed.

In yet another environment, routing protocols use the trust information for establishing routing protocol security. Instead of using manually maintained pre-shared secrets specific to the routing protocol, the validation information determined during neighbor discovery is used. Another possible use case is for automatically classifying devices or vehicles based on secure authentication (e.g., Identification friend or foe (IFF)).

A general approach for creating and use of trust information from neighbor discovery is provided above in the context of the network of FIG. 1 and the network device of FIG. 3. FIG. 4 shows a method for generating trust information using neighbor discovery and use of the trust information by other local protocols. The method is implemented by the network devices 12 of FIG. 1, the network device 70 of FIG. 3, or other devices. For example, the processor 70 performs the acts 20, 22, and 24. Additional, different, or fewer acts may be provided, such as implementing act 20 with the acts of FIG. 5 and implementing act 24 with the acts of FIG. 6. The acts are performed in the order shown or a different order.

In act 20, trust information is generated using neighbor discovery. Any type of trust information may be generated, such as type of certificate, certificate validity, password comparison, shared-key, timing of checks, updating, type of discovery, and/or revocation.

To establish communications, a neighbor discovery protocol (NDP) of the Internet protocol suite is performed, such as IPv6 SEND or other layer two or three discovery. The NDP operates in the Internet layer of the Internet model, but may operate in other layers. The NDP is responsible for address autoconfiguration of network devices 12, discovery of other network devices 12 on each link, determining the link layer (layer 2) addresses of other network devices 12, duplicate address detection, finding available routers and domain name system (DNS) servers, address prefix discovery, and/or maintaining reachability information about the paths to other active neighbor network devices 12. In an embodiment using IPv6, the neighbor discovery may include different ICMPv6 packet types to perform functions, such as packets for router solicitation, router advertisement, neighbor solicitation, neighbor advertisement, and/or redirect. Other embodiments and corresponding packets may be used, such as for an address resolution protocol, the Internet control message protocol, router discovery protocol, and/or router redirect protocol. Other neighbor discovery protocols or techniques may be used.

Trust information about other devices is generated at a local device. Each or a sub-set of the network devices in a network creates trust information for neighbors of the corresponding device. Each network device establishes trust information for its neighbors. Local device is used to indicate a network device establishing trust with neighboring devices. The discussion below for FIGS. 5 and 6 is for a given local device. Other network devices operate in the same or different manner.

FIG. 5 shows one embodiment for implementing act 20 of FIG. 4. Additional, different, or fewer acts may be used. The acts are performed in the order shown or a different order. The receiving of act 32, determining of act 34, and storing of act 36 are performed locally at each or some of the neighbor network devices. Each local device performs acts 32, 34, and 36, but some local devices may not. The local devices also multicast in act 30 to any neighboring devices. The neighboring devices receiving the multicast authentication perform as local devices.

In act 30, authentication or neighbor discovery packets are multi-cast from a local device. The neighbor discovery package is sent or multicast from the ports and/or over links to the neighboring network devices. Depending on the underlying network technology, one or more discovery methods might be initiated. For example, in autonomic networking (AN), the neighbor discovery process sends out a discovery packet to all local neighbors by sending the packet to the IPv6 link-local "all-nodes" multicast address. The neighbor discovery package may be transmitted from fewer than all of the ports or links. The package is transmitted in general or without specifically addressing other devices. Alternatively, single or directed transmission of the package is used.

The neighbor discovery occurs without request, such as periodically (e.g., every thirty seconds) transmitting neighbor discovery packages. Any time period may be used. Rather than multi-casting, a request and response or polling arrangement may be used.

The neighbor discovery package is included as part of neighbor discovery. The neighbor discovery is implemented at layers 2 or 3 of the TCP/IP stack. The neighbor discovery package is included with router solicitation, router advertisement, neighbor solicitation, neighbor advertisement, and/or redirect packages. For example, IPv6 secure neighbor discovery (SEND) is used to verify the authenticity of IPv6 router advertisement messages as well as validate messages from a neighbor device. The neighbor discovery package is a generic mechanism to transmit credentials to neighbors and receive credentials from neighbors. The neighbor discovery package may be sent as part of another neighbor discovery protocol with the same or different security, such as Internet security protocol (IPsec). The neighbor discovery package may be transmitted as part of a layer 2 or layer 3 protocol other than neighbor discovery, such as a protocol for creating generic trust information to be used by other protocols.

Other example neighbor discovery protocols include multicast and single-hop protocols (e.g., IPV5 Neighbor Discovery, Cisco Discovery Protocol (CDP), Link Layer Discovery Protocol Media Endpoint Devices (LLDP-MED), Bonjour, Universal Plug and Play (UPnP), or Service Advertisement Framework (SAF)). Any neighbor discovery may be used.

The neighbor discovery package includes any desired information or credentials to be used for authentication. For example, the payload includes a certificate, key, shared-information, identification (UDI), or other information. Key encrypted information, a nounce, token, or other information for verifying identity may be included. In one embodiment, a device includes a secure form of authentication credentials, such as a domain-specific X.509 certificate, key, or other cryptographic information. The certificate is assigned to the device and binds the device identity and the domain identity together by creating an authorization token. The token is signed with a trusted private key. The token is stored as credentials by the device for transmission as the authentication information. The respective credentials are stored on the neighboring devices and received by any given local device for validation.

In one embodiment, the neighbor device has an electronically stored credential (e.g., manufacturing installed credential) to provide a level of trust between the device and a manufacturing service. The credential enables the device to trust a manufacturer service and vice-versa. In one example embodiment, the manufacturing installed credential may be an Institute of Electrical and Electronics Engineers (IEEE) 801.1AR initial device identifier (IDevID), or any other similar instantiation. The manufacturing installed credential is also referred to herein as a secure unique device identifier (secure UDI or 'SUDI'). A UDI can include a product identifier (PID), a version identifier (VID), and/or a serial number (SN) of the new device. Either a secure UDI or an unsecured UDI may be used as or provide as part of the credential for the neighbor discovery package.

In act 32, one or more neighbor discovery packages transmitted by neighboring devices are received by a local device. Different local devices receive the packages of the network devices neighboring the local device. A network device receives neighbor discovery packages for neighboring devices. The network device uses information from the neighbors for discovery and authentication. The network device receives information from any neighbor devices configured to transmit authentication information. All, multiple, one, or no neighbor devices may provide the authentication information. Where multi-casting is used, the neighbor discovery packages of neighbor network devices are received in the neighbor discovery operations. When a device wakes up and/or on a regular basis, the device performs neighbor discovery on all active interfaces using a set of pre-defined neighbor discovery algorithms.

The adjacency protocol operates on one or more layers in the stack, such as layer 2 or layer 3. Neighbor discovery packages from the neighbor network devices are received at layer 2 such that the neighbor network devices are directly linked to the computer network device. At layer 2 for autonomic networking, neighbor discovery is performed between two autonomic devices across the L2 link that interconnects them. In alternative embodiments, the packages are routed over any number of hops, such as associated with layer 3 messaging. At layer 3 for autonomic networking, neighbor discovery is performed between two autonomic L3 nodes or autonomic hosts across a layer 2 domain that interconnects them. This allows two such autonomic nodes to discover each other across a non-autonomic L2 network. Another use-case is to allow two autonomic routers to find out that both of routers are connected to the same autonomic L2 portion of the network. An autonomic device accepts the packets associated with the neighbor discovery process, even on "external" interfaces, where by definition all dataplane traffic is dropped on ingress.

Neighbor discovery packets may be secured. Securing may allow for origin verification. The origin of a neighbor discovery packet is cryptographically verified. For example, the credentials of that neighbor are used to sign parts of the packets, or the entire packets. The packet may include a nonce or time stamp to guarantee freshness. Integrity violation detection may be used to avoid modification of the packet. Since it is not assumed that neighbor discovery packets carry confidential information, confidentiality protection (encryption) may not be required.

In one embodiment, the neighbor discovery is part of autonomic networking. Since autonomic devices are open on all interfaces to receive neighbor discovery packets, protection against distributed denial of service using discovery packets is provided. Any counter measure may be used, such as a rate limiter per interface or shutting down any assaulted interface for a period of time if the limiter is not sufficient. The shut down may happen just if the device is not capable of handling the load (e.g., when the CPU load is over a certain threshold (say, 80%)).

For autonomic networking, the adjacency protocol includes a protocol version. A version number is exchanged in the neighbor discovery process to indicate the version of the protocol. The version number may be used to establish communications and/or processes for neighbor discovery. The version number may be stored, such as where the version of the protocol may indicate a level of trust.

The adjacency protocol includes a domain identity. The exchange of domain information is provided. A subset of a domain may be supported (e.g., for domain cisco.com, providing building24.cisco.com, or marketing.cisco.com). Every autonomic device is part of one single domain only. A new device initially is not part of any domain. New devices participate with a default (empty) domain name and their device ID (UDI).

The discovery may include capability information. The devices may announce their capabilities, for example whether a device has a routing functionality, whether the device may act as a management station, whether the device may act as an autonomic network registration authority (ANRA—a device that controls admission of new devices to an autonomic domain and provides the new devices with domain identities), and the type of autonomic control plane supported. New capabilities may be added to the neighbor discovery packet without changing the protocol or the protocol version. The neighbor discovery capabilities field is used to announce those capabilities for determining the next steps, such as announcing that a certain management station is not capable of doing the capability exchange step or a host does not support an activity concentration point (ACP) device.

If an adjacent device does not support autonomic behavior, no response to a neighbor discovery message may be received. The recognition of whether a neighbor is autonomic is implicit, not explicit in the protocol. It is possible that there is no response on any interface. In that case, alternative ways to reach potential neighbors are attempted, in sequence. For example, specific L2 settings (e.g., VLAN IDs, or DSL parameters) are attempted. Different parameters or methods may be attempted. If all fail, the process is repeated. This approach allows finding neighbors in different ways, adapting automatically to various network types.

The received neighbor discovery package is used to validate the corresponding network device in act 34. The network device determines a level of validation of each of the neighbor network devices from the neighbor discovery packages. Level indicates type of validation, results of validation, or other indication of values of trust information.

The authentication credentials are extracted by the local device from the neighbor discovery package. The payload and any header information used for authentication are identified. The payload from the received neighbor discovery packets of other devices is extracted.

The extracted credentials are validated. Various types of validation may be used. Certificates signed by the domain root may be used to validate certificates of a same domain. The domain hash in the package is the hash of the domain root public key data. The root credential is matched to the domain hash. Thus, the domain hash extracted from the package is used to verify the signature. For example, X.509 certificate validation is performed. To validate the certificate, a certificate that matches the issuer of the received certificate is stored in the local device. First, the local device verifies that the certificate of the neighbor device is the appropriate type. For example, a value of an attribute in the X.509v3 extension section is inspected. Then, the public key from the stored certificate is used to decode the signature on the certificate from the neighbor device to obtain a MD5 hash, which must match an actual MD5 hash computed over the rest of the certificate. Other cryptographic validation may be used, with or without calls to a centralized server.

Password-based or manually configured lists may be used for validation. The credentials may include a password or identifier. Using the stored or retrieved password and/or list of devices, the neighbor may be validated. Nounce, time stamping, or other processes may be used to indicate trust.

More than one type of validation may be used for a given neighbor device. For example, the network device determines whether there is a common trust anchor, determines whether there is a certificate-based verification, determines whether an identity is valid, and determines whether a most recent certificate is expired. For example, if a network device receives a domain-specific X.509 certificate from a neighbor device, the network device validates the certificate structure and format. The certificate validation uses the root certificate and/or certificate chain of the issuer of the received certificate. If other types of credentials are received, for example a MD5 pre-shared secret, that information is validated accordingly.

The certificate does not necessarily have to be from the same domain as the receiving device. If both devices have a common trust anchor, the certificate may be validated. This makes it possible to validate the identity of devices belonging to other domains. It is up to the upper layer protocols to decide whether to establish a connection to the other device, even when the other device belongs to a different domain.

There are various processes for checking the identity of a neighbor, with various levels of security. Any process of validation using cryptographic identities may be used. The network devices are loaded with a pre-shared key. There may be subclasses in this category. For example, different methods provide for different levels. SUDI, 802.1x, Trustsec, or secure CDP (sCDP) types of validation may provide for different levels of validity. The validation relies on the network device performing the validation being part of a domain. In an autonomic network example, both autonomic devices may not have a domain identification. The devices may exchange their SUDI information with an empty domain name. The devices may however validate their SUDIs mutually. This is a valid result, and is recorded in the neighbor table as such. So if there is no domain and/or ANRA in a network, the network may still form properly using default parameters. As another example, other factors associated with the validation may indicate a level of validity. A size or strength of encryption used, ability to check for revocation, access to resources outside the network device and/or network, the source of information used in validating, or other aspects may indicate validity.

Other validity determinations may be used instead of or as an alternative. For example, validation of simple identities (e.g., UDI) may be used. No validation may be used. Attempted validation with the result being a validation error may occur.

The validation begins with validation appropriate for the extracted credentials. Alternatively, the validation is performed from a highest level of validity to a lowest level, with each being attempted. If a highest level of validation fails, the next lower class of validation level may be used (e.g., attempting cryptographic validation, then attempting simple identities validation if cryptographic validation fails). Multiple classes of validation may be performed even with success in a higher level of validation.

The extraction and following validation is performed automatically without having to perform further interaction with the other devices. Any needed verifications, such as other keys from third parties, are stored on the network devices. Passwords, access lists, identities, or other information may be stored locally. A list of legitimate devices may be obtained in a number of different ways. The UDIs of purchased or otherwise acquired devices may be manually entered, loaded from a bill-of-sale, or scanned in from a barcode. In one embodiment providing for little manual maintenance, domain associated shared-key information is stored on the network device. This information is sufficient to authenticate another network device as part of the same domain. Third party verification information may be stored locally. The local device validates without a call outside the local device. Rather than consult with a centralized server, the validation occurs locally. Between extracting the credentials and validating the credentials, validating is performed without interaction for validating with other network devices. The information provided by a neighbor is validated as securely as possible given this restriction.

In alternative embodiments, remote access and associated calls are performed for validation. A request for authentication is sent to a server. The server returns information validating or that may be used to validate the neighbor device. Trusted party or a trust anchor service may indicate validity. The reliance or not on calls for validity may provide an indication of trust.

Other trust information may be gathered in validation. Periodically or as validation is performed, the certificate is checked for revocation. A revocation list is maintained at the local network device or a remote device. For example, a centralized revocation list is used to validate if the neighbor credentials have been revoked. Identities may be validated locally but a centralized authority may decide to not allow a specific device to connect to the domain (e.g., not allow a stolen device to connect). The revocation list is of devices for which authentication is revoked, such as compromised devices. The list is generated automatically or manually.

This verification is about validity, not trust. The neighbor discovery provides validity information. Whether or not a neighbor is trusted is an independent decision. It is possible that a cryptographically validated neighbor of the same domain is not trusted (e.g., if a device is compromised). It is also possible that a simple identity is trusted.

The results of the validity operations are stored in act 36. The storage is at the network device. The results of the validation or validations are stored locally at the device that received the credentials and performed the validation. As represented in FIG. 1, tables 14 of trust information are created and stored at various network devices 12. The results may be stored remotely in other embodiments.

The results are stored as a table. Any format of table may be used, such as fields in a database. The results fields may account for various possibilities. Binary information may be stored, such as valid or not valid. Other outputs may be stored, such as a measure or an "error" result.

The table includes the level of validation for each of the neighbor network devices. Level is used to indicate a class or specific information about the validating, not a judgment or ranking. For example, the type of validation and the results (yes or no) of the validation are stored. Validity attributes may be stored to indicate the level. The result of local evaluation of the validity may provide information for a trust anchor (e.g., "have common trust anchor"; "do not have a common trust anchor"), whether the certificate is valid or not, whether the identity is valid or not, and/or freshness (e.g., "cert expired"; "cert fresh"; "unknown").

FIG. 2 shows one example table. In another example, a neighbor table is populated with information for any detected neighboring devices. For each neighbor device, the table includes entries for the neighbors identification (e.g., "router1.cisco.com"), where (e.g., port or interface) and/or when the neighbor device was discovered (e.g., "Fastethernet1/1", "12:37:33 01/01/12"), the discovery method (e.g., "Autonomic SEND"), the credentials (e.g., X.509 certificate) and the results of the validation of these credentials (e.g., "Certificate valid", "CRL check passed"). The neighbor identification may include the host name and domain name of the device. Any possible discovery method may be identified, such as manual, L3 discovery, L2 discovery, or CDP. Any possible credentials may be identified, such as an X.509 certificate, a SUDI, or <empty>.

Other information reflective of trust may be stored. For example, the table includes the information about the neighbor (e.g., domain and identity), the received credentials (e.g., X.509 certificate), and the results of the validation. As another example, the method by which the validation information is obtained is stored. Other information may be provided, such as the use of a nounce, secure UDI, unsecure UDI, password, call or not to a remote verification server, check for revocation or not, or manufacturer of the device.

The receiving, validation, and storing of acts 32, 34, and 36 are repeated for various neighbor devices. The repetition results in validation information for each of the neighbors in a table. Each neighbor also creates their own table for the corresponding neighbors.

Other information than trust information may be stored. For example, the capabilities of the neighbor device may be stored. The capabilities may also indicate trust, such as devices not capable of performing some operations indicating devices not intended to be connected to a given network.

The table may be modified. The validation may be performed each time neighbor discovery occurs. The occurrence may be based on a time trigger of the local device. The occurrence may occur whenever a neighbor discovery package is received. Other triggers may be used.

The modification may be to replace results. For example, a neighbor device may have had an invalid certificate. A neighbor discovery package may provide a new certificate, which is valid. The certificate and the validity are stored in the table instead of the old certificate and the invalid result.

The modification may remove results in act 38. Some aspect of the level of validity is removed. For example, the "valid" entry of a certificate is removed due to time. If a further certificate has not been received, the "valid" may be replaced with a blank or "invalid." Where repeating of the neighbor discovery does not provide an update or confirm current entries, old entries may be removed. On a regular basis, the information about a specific neighbor in the neighbor table is removed if no update has been received during a pre-defined timeout (e.g., 30 seconds). This timeout may vary based on the authentication protocol used. Rather than removal, a failure to update may trigger a request for authentication information. A directed neighbor discovery probe packet is transmitted. If no response is provided to the discovery probe packet, then the results may be removed. All or only some information may be removed. For example, FIG. 2 shows leaving the results of validity but removing timing information where an update has not occurred.

Referring again to FIG. 4, the local network device operates a plurality of protocols. Only one protocol may be operated in other embodiments. The stored trust information is available to any protocols operated by the local network device. To operate a protocol, the computer network device runs an instance of an application.

The protocols are at level three or higher of the TCP/IP stack. The protocols are at a higher layer than the neighbor discovery used to obtain the trust information. Level two protocols may use the trust information in other embodiments.

Any protocols using communications with other network devices may use the trust information. For example, routing, virtual private network, Trustsec, or other protocols use the trust information. Any application having a reason to communicate with neighbor devices may use the trust information to determine what, when, and where to communicate. For example, a security process may define a security perimeter based on domain boundaries established from the trust information (e.g., use the valid identification of devices in the same domain to establish a boundary). Control planes between network devices may be set up with certain types of neighbors only. Different types of data may or may not be communicated with neighbor devices.

The protocols rely on the generically available trust information rather than coupled validation. The validation is not performed specifically for or by the protocols, relying on the table instead. The receiving of authentication information from neighbor devices, determining validity of the authentication, and storing the results are performed decoupled from operating and establishing other protocols. The neighbor discovery provides the trust information. The protocols include criteria for determining trust from the trust information. The protocols include the trust judgments appropriate for the protocol.

In other embodiments, one or more aspects of validation are performed as needed by any protocols. If the desired information is not available in the trust table, the protocol may acquire the information. Some protocols may use the neighbor table simply to identify potential neighbors. The protocols may establish unidirectional communication with that device and do a full validation step on any credentials passed using that protocol rather than using the trust table.

In act 24, any protocol attempting to establish communications with a neighbor device or other components of the network consults with the trust information. The application implementing a protocol at the local device consults the neighbor table for the local device. The table includes trust information determined by the local device for neighbor devices.

The trust information is accessed to determine results of credential validation. Other information indicating trust may be accessed. For example, verified domain membership information is accessed. As another example, the timing and/or interface used for validation is accessed. In yet another example, a method of validation, type of certificate, trust anchor, class of validation, and/or other information is accessed.

The trust information is accessed to make a trust judgment. Different types of information and corresponding protocols may require different amounts of trust. For example, a verified domain membership and validity by cryptographic identity is required by one protocol. Another protocol may not need verified domain membership but require validity by cryptographic identity. Yet another protocol may require verified domain membership but no specific validity results. Other indications of trust may be used in the judgment, such as the timing of the validation and/or the type of discovery method.

The upper layer protocols decide how to use the trust information and if a specific neighbor may be trusted or not. For example in autonomic networking, a neighboring device with a valid domain certificate and which is a member of the same domain is considered to be trusted for establishing the neighbor device as part of the same network without further centralized or manual configuration.

FIG. 6 shows an example embodiment of consulting the trust information in act 24 of FIG. 4. Additional, different, or fewer acts may be provided.

In act 40, the communication authority for each of the protocols with one or more of the neighbor network devices is established by consulting the table and corresponding level of validation in act 24 of FIG. 4. The authorization to communicate is based on the results of the validation and/or other information accessed from the trust information. Using a trust judgment appropriate for the protocol for a given communication, the communication authority is established. Different protocols make the same or different trust determination based on the available trust information of the table. The level of validation reflected in the trust table is compared to a level of required trust for a communication.

In act 44, the communications link is denied. Where the consulted trust information does not indicate sufficient trust, the communications link is denied. The communications are not provided from the local device to the specific neighbor device. For example, a virtual private network application may not trust unless a X.509 certificate is valid. If the other methods of validating are used, the virtual private network is not established through the neighbor device.

Other neighbor devices may have the desired level of trust. In act 42, the communications link may be allowed. Another neighbor device may have trust information indicating sufficient trust, such as a valid X.509 certificate. For example, an application associated with Trustsec uses the trust information rather than calls for centralized authority to establish the communications.

One neighbor device may be associated with sufficient trust for one protocol and insufficient trust for another protocol. Another neighbor device may be associated with sufficient trust for all protocols implemented on a local device. Yet another neighbor may be associated with insufficient trust for any of the protocols. Any combination of trustworthiness for different protocols and neighbor devices may result.

The protocols determine trust from the gathered trust information to establish communications with one or more neighbor devices. By performing the generation of trust information and use of the trust information in different network devices, communications throughout the network and/or between networks is established using local decisions.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   initiating, by a computer network device, neighbor discovery using a neighbor discovery protocol responsible for discovery of a plurality of neighbor network devices on each layer 2 or layer 3 link of the computer network device;
   receiving, by the computer network device during neighbor discovery, neighbor discovery packages from the plurality of neighbor network devices, wherein the neighbor discovery packages are part of discovering the plurality of neighbor network devices pursuant to the neighbor discovery protocol and the neighbor discovery packages include validation data for each of the neighbor network devices, wherein the received validation data comprises one or more authentication credentials and a type of neighbor discovery protocol used to perform the neighbor discovery, wherein the one or more authentication credentials comprises one or more of: a certificate, cryptographic identification, a unique device identifier, a key, a token, shared information, a common trust anchor, domain membership, or a password;
   validating, by the computer network device, the one or more authentication credentials for each of the neighbor network devices, wherein an indication of whether each authentication credential of the one or more authentication credentials is valid and timing information indicative of when the indication was determined is added to the received validation data;
   storing, at the computer network device, an identity of the neighbor network device, the one or more authentication credentials for the neighbor network device, the indication of whether each of the one or more authentication credentials is valid, the timing information indicative of when the indication was determined, and the type of neighbor discovery protocol included in the received validation data for each of the neighbor network devices in a trust information table;
   operating, by the computer network device, a plurality of protocols;
   establishing communication authority for each of the protocols with one or more of the neighbor network devices using the trust information table to determine a level of trust for each of the neighbor network devices, wherein each of the protocols requires a particular level of required trust to establish communication authority;
   wherein a first one of the protocols requires a first level of required trust to establish communication authority and a second one of the protocols requires a second level of required trust to establish communication authority, the first level of required trust being different from the second level of required trust; and
   wherein the first level of required trust requires a neighbor network device to have at least one authentication credential of a first type stored in the trust information table, and the second level of required trust requires a neighbor network device to have at least two authentication credentials of different types stored in the trust information table.

2. The method of claim 1, wherein receiving the neighbor discovery packages during the neighbor discovery comprises receiving the neighbor discovery packages as sent discovery packages.

3. The method of claim 1, wherein receiving the neighbor discovery packages comprises receiving the neighbor discovery packages from the neighbor network devices at a layer 2 such that the neighbor network devices are directly linked to the computer network device.

4. The method of claim 1, wherein validating the one or more authentication credentials comprises:
   extracting each of the one or more authentication credentials from the neighbor discovery package for the neighbor network device; and
   periodically checking each of the one or more authentication credentials for revocation.

5. The method of claim 4, wherein validating is performed without interaction for the validating with any other network device between the extracting and the validating.

6. The method of claim 1, wherein validating the one or more authentication credentials comprises performing validation of authentication credentials in an order from a higher class of validation to a lower class of validation.

7. The method of claim 1, wherein storing further comprises storing information associated with capabilities of each neighbor network device in the trust information table.

8. The method of claim 1, further comprising checking a revocation list for the one or more authentication credentials for each neighbor network device.

9. The method of claim 1, further comprising:
   repeating the receiving, determining, and storing;
   removing a first one of the neighbor network devices from the trust information table where the repeating does not update the trust information table for the first one of the neighbor network devices.

10. The method of claim 1, wherein operating comprises running an instance of an application for each of the protocols, the protocols being level three or higher of a TCP/IP stack.

11. The method of claim 1, wherein the plurality of protocols are free from coupled validation.

12. The method of claim 1, wherein receiving, validating, and storing are performed decoupled from operating and establishing.

13. The method of claim 1, wherein establishing comprises establishing for one of the neighbor network devices the authority for multiple protocols of the plurality of protocols wherein the trust information table is used by the multiple protocols.

14. The method of claim 1, further comprising:
sending a neighbor discovery package for the computer network device to the neighbor network devices; and
performing the receiving, validating, and storing locally at each of the neighbor network devices.

15. Logic encoded in one or more non-transitory computer-readable media that includes code for execution and when executed by a processor is operable to perform operations comprising:
receiving, at a local device, neighbor discovery packages from other devices, the neighbor discovery packages produced as part of a neighbor discovery protocol responsible for discovering the other devices at layer 2 or layer 3, wherein the neighbor discovery packages include validation data for communicating with the other devices, the received validation data comprising one or more authentication credentials and a type of neighbor discovery protocol used, wherein the one or more authentication credentials comprises one or more of: a certificate, cryptographic identification, a unique device identifier, a key, a token, shared information, a common trust anchor, domain membership, or a password;
validating, at the local device, the one or more authentication credentials for each of the other devices, wherein an indication of whether each authentication credential of the one or more authentication credentials is valid and timing information indicative of when the indication was determined is added to the received validation data;
generating, at the local device, a trust information database about the other devices using the received neighbor discovery packages and the validation data, wherein the trust information database includes: an identity of each of the other devices, the one or more authentication credentials for each of the other devices, the indication of whether each of the one or more authentication credentials is valid, the timing information indicative of when the indication was determined, and the type of neighbor discovery protocol;
consulting the trust information database at the local device by applications running on the local device to determine a level of trust for the other devices;
denying the local device from establishing a communication link to a first device of the other devices for a first of the applications based on the consulted trust information database; and
allowing the local device to establish a communications link to a second device of the other devices for a second of the applications based on the consulted trust information database;
wherein the communication link for the first of the applications requires a first level of required trust to establish communication authority and wherein the communication link for the second of the applications requires a second level of required trust to establish communication authority, the first level of required trust being different from the second level of required trust; and
wherein the first level of required trust requires the first device to have at least one authentication credential of a first type stored in the trust information database, and the second level of required trust requires the second device to have at least two authentication credentials of different types stored in the trust information database.

16. The logic of claim 15, wherein generating the trust information database comprises receiving authentication information as part of neighbor discovery and performing validation at the local device without a call outside the local device.

17. The logic of claim 15, wherein consulting the trust information database comprises consulting for a result of credential validation and for a domain membership for the first device of the other devices.

18. The logic of claim 15, wherein denying comprises denying where the first application comprises a VPN application, and wherein allowing comprises allowing wherein the second application comprises an access list-based application.

19. An apparatus comprising:
a memory operable to store trust information about a plurality of communicatively connected devices in a trust information database; and
a processor configured to:
receive neighbor discovery packages, the neighbor discovery packages including validation data for communicating with the plurality of communicatively connected devices, from the plurality of communicatively connected devices during initial neighbor discovery of the plurality of communicatively connected devices as part of a neighbor discovery protocol responsible for discovering the communicatively connected devices at each link from the apparatus, wherein the received validation data comprises one or more authentication credentials and a type of neighbor discovery protocol used to perform the neighbor discovery, wherein the one or more authentication credentials comprises one or more of: a certificate, cryptographic identification, a unique device identifier, a key, a token, shared information, a common trust anchor, domain membership, or a password;
validate the one or more authentication credentials for each of the devices, wherein an indication of whether each authentication credential of the one or more authentication credentials is valid and timing information indicative of when the indication was determined is added to the received validation data;
store in the trust information database, for each of the devices, an identity of the device, the one or more authentication credentials for the device, the indication of whether each of the one or more authentication credentials is valid, the timing information indicative of when the indication was determined, and the type of neighbor discovery protocol;
perform a plurality of protocols that determine whether or not to communicate with individual ones of the devices using the trust information database to determine a level of trust for each of the devices, wherein each of the protocols requires a particular level of required trust to establish communication authority;
wherein a first one of the protocols requires a first level of required trust to establish communication authority and a second one of the protocols requires a second level of required trust to establish communication authority, the first level of required trust being different from the second level of required trust; and wherein the first level of required trust requires a device to have at least one authentication credential of a first type stored in the trust information database, and the second level of required trust requires a device to have at least two authentication credentials of different types stored in the trust information database.

20. The apparatus of claim 19, wherein the protocols are free of validation determination other than calls to values determined by the processor during the neighbor discovery.

21. The apparatus of claim 19, wherein the processor is configured to store information associated with capabilities of each device in the trust information database.

22. The apparatus of claim 19, wherein the processor is configured to check a revocation list for the one or more authentication credentials for each device.

* * * * *